(12) United States Patent
Lin et al.

(10) Patent No.: US 11,698,569 B2
(45) Date of Patent: Jul. 11, 2023

(54) DISPLAY DEVICE

(71) Applicant: E Ink Holdings Inc., Hsinchu (TW)

(72) Inventors: Yi-Sheng Lin, Hsinchu (TW);
Chia-Chun Yeh, Hsinchu (TW);
Kuan-Yi Lin, Hsinchu (TW); Po-Yu Hsiao, Hsinchu (TW)

(73) Assignee: E Ink Holdings Inc., Hsinchu (TW)

( * ) Notice: Subject to any disclaimer, the term of this patent is extended or adjusted under 35 U.S.C. 154(b) by 389 days.

(21) Appl. No.: 16/876,105

(22) Filed: May 17, 2020

(65) Prior Publication Data
US 2021/0018812 A1    Jan. 21, 2021

(30) Foreign Application Priority Data
Jul. 19, 2019    (TW) .................................. 108125725

(51) Int. Cl.
*G02F 1/1679*    (2019.01)
*G02F 1/16755*   (2019.01)
*G02F 1/1333*    (2006.01)
*G02F 1/16753*   (2019.01)
*G02F 1/167*     (2019.01)

(52) U.S. Cl.
CPC ...... *G02F 1/1679* (2019.01); *G02F 1/133305* (2013.01); *G02F 1/167* (2013.01); *G02F 1/16753* (2019.01); *G02F 1/16755* (2019.01); *G02F 2201/50* (2013.01); *G02F 2202/28* (2013.01)

(58) Field of Classification Search
None
See application file for complete search history.

(56) References Cited

U.S. PATENT DOCUMENTS 7,791,782 B2    9/2010    Paolini, Jr. et al.
8,243,424 B1    8/2012    Babu et al.
(Continued)

FOREIGN PATENT DOCUMENTS

CN    102183858 A    9/2011
CN    106652802 A    5/2017
(Continued)

OTHER PUBLICATIONS

Corresponding Chinese office action dated Mar. 29, 2022.
(Continued)

*Primary Examiner* — Phu Vu
(74) *Attorney, Agent, or Firm* — CKC & Partners Co., LLC

(57) ABSTRACT

A display device includes a flexible display panel, a sealant, and a first reinforcing structure. The flexible display panel includes a lower substrate, an upper substrate, and a display medium layer disposed between the lower substrate and the upper substrate. Each of the lower substrate and the upper substrate has an edge region. A centerline of the flexible display panel is parallel to a short side of the flexible display panel. The sealant is disposed between the edge region of the lower substrate and the edge region of the upper substrate. The first reinforcing structure is disposed among the sealant, the edge region of the lower substrate, and the edge region of the upper substrate. The centerline of the flexible display panel passes through the first reinforcing structure, and the elastic modulus of the first reinforcing structure is greater than that of the sealant.

23 Claims, 10 Drawing Sheets

(56) References Cited

U.S. PATENT DOCUMENTS

| | | | |
|---|---|---|---|
| 9,819,815 B1 | 11/2017 | Babu et al. | |
| 9,978,984 B2 | 5/2018 | Sun | |
| 2012/0154707 A1 | 6/2012 | Hsieh et al. | |
| 2015/0004345 A1 | 1/2015 | Chaung et al. | |
| 2015/0256658 A1* | 9/2015 | Shin .................... | H04M 1/0266 |
| | | | 455/566 |
| 2016/0062206 A1 | 3/2016 | Paolini, Jr. et al. | |
| 2016/0111678 A1* | 4/2016 | Lee ..................... | H01L 51/5246 |
| | | | 257/40 |
| 2017/0263885 A1 | 9/2017 | Sun | |
| 2018/0182984 A1* | 6/2018 | Lim ................... | H01L 51/5246 |
| 2018/0219177 A1 | 8/2018 | Sun | |
| 2018/0242466 A1 | 8/2018 | Lee et al. | |

FOREIGN PATENT DOCUMENTS

| | | |
|---|---|---|
| CN | 107578707 A | 1/2018 |
| CN | 109300970 A | 2/2019 |
| CN | 109377887 A | 2/2019 |
| CN | 208753324 U | 4/2019 |
| CN | 109830184 A | 5/2019 |
| JP | 2007-127763 A | 5/2007 |
| JP | 2013-084014 A | 5/2013 |
| KR | 20190070740 A | 6/2019 |
| TW | 201225030 A | 6/2012 |
| WO | 2012120665 A1 | 9/2012 |

OTHER PUBLICATIONS

Corresponding Taiwan office action dated Jun. 17, 2020.
The office action of corresponding JP application No. 2019-189833 dated Apr. 25, 2023.

* cited by examiner

DISPLAY DEVICE

CROSS-REFERENCE TO RELATED APPLICATION

This application claims priority to Taiwan Application Serial Number 108125725, filed Jul. 19, 2019, which is herein incorporated by reference in its entirety.

BACKGROUND

Technical Field

The present disclosure relates to a display device, and more particularly, to a display device including a flexible display panel.

Description of Related Art

In the current market of various consumer electronic products, flexible display panels have been widely used as display screens for electronic products, such as electronic paper. The display medium layer of the flexible display panel is mainly composed of an electrophoresis liquid and white and black particles which are doped into the electrophoresis liquid. By applying a voltage to the display medium layer, the white and black particles can be driven to move, so that each pixel region individually displays black, white, or gray scale. Since the flexible display panel uses the reflection of the incident light (e.g., sunlight or indoor ambient light) which illuminatines the display medium layer to achieve the display effect, the backlight is not required and the power consumption can be saved.

However, when the display device including the flexible display panel is bent, a misalignment occurs between the inner ring edge and the outer ring edge due to the thickness of the display device itself. In other words, the layer of the inner ring shrinks more than the layer of the outer ring. If the misalignment occurs only on one side of the display device, the stress/strain is easily accumulated to result in the problem of delamination.

SUMMARY

According to one embodiment of the present disclosure, a display device includes a flexible display panel, a sealant, and a first reinforcing structure. The flexible display panel includes a lower substrate, an upper substrate and a display medium layer disposed between the lower substrate and the upper substrate. Each of the lower substrate and the upper substrate has an edge region. A centerline of the flexible display panel is parallel to a short side of the flexible display panel. The sealant is disposed between the edge region of the lower substrate and the edge region of the upper substrate. The first reinforcing structure is disposed among the sealant, the edge region of the lower substrate, and the edge region of the upper substrate. The centerline passes through the first reinforcing structure, and the elastic modulus of the first reinforcing structure is greater than the elastic modulus of the sealant.

In the aforementioned embodiment of the present disclosure, since the centerline of the flexible display panel passes through the first reinforcing structure and the elastic modulus of the first reinforcing structure is greater than the elastic modulus of the sealant, the edge region of the lower substrate and the edge region of the upper substrate in the positions adjacent to the centerline are relatively steady when the display device is bent. As a result, the strain caused by bending can be dispersed on opposite two sides of the display device, thereby avoiding the occurrence of unilateral misalignment and delamination.

According to one embodiment of the present disclosure, a display device includes a flexible display panel, an upper protective layer, a first adhesive layer, a lower protective layer, and a second adhesive layer. The flexible display panel includes a lower substrate, an upper substrate and a display medium layer disposed between the lower substrate and the upper substrate, wherein a centerline of the flexible display panel is parallel to a short side of the flexible display panel. The first adhesive layer is disposed between the upper protective layer and the upper substrate. The second adhesive layer is disposed between the lower protective layer and the lower substrate, wherein at least one of the first adhesive layer and the second adhesive layer has greater viscosity or elasticity in the position close to the centerline than in the position far away from the centerline.

In one embodiment of the present disclosure, since the first adhesive layer or the second adhesive layer has greater viscosity or elasticity in the position close to the centerline than in the position far away from the centerline, the upper protective layer and the lower protective layer in the positions adjacent to the centerline are relatively steady when the display device is bent. As a result, the strain caused by bending can be dispersed on opposite two sides of the display device, thereby avoiding the occurrence of unilateral misalignment and delamination.

According to one embodiment of the present disclosure, a display device includes a flexible display panel, an upper protective layer, a first adhesive layer, a lower protective layer, and a second adhesive layer. The flexible display panel includes a lower substrate, an upper substrate and a display medium layer disposed between the lower substrate and the upper substrate, wherein a centerline of the flexible display panel is parallel to a short side of the flexible display panel. The first adhesive layer is disposed between the upper protective layer and the upper substrate. The second adhesive layer is disposed between the lower protective layer and the lower substrate. At least one of the upper protective layer, the upper substrate and the lower protective layer has a concave portion or a convex portion, the concave portion or the convex portion contacts one of the first adhesive layer and the second adhesive layer, and the centerline passes through the concave portion or the convex portion.

In one embodiment of the present disclosure, since the upper protective layer, the upper substrate and the lower protective layer can have a concave portion or a convex portion, the concave portion or the convex portion can contact the first adhesive layer and the second adhesive layer, and the centerline passes therethrough, the upper protective layer, the upper substrate and the lower protective layer can contact more adhesive layer in the respective concave portion or convex portion than in other areas when the display device is bent, thereby the upper protective layer and the lower protective layer in the positions adjacent to the centerline being relatively steady. As a result, the strain caused by bending can be dispersed on opposite two sides of the display device, thereby avoiding the occurrence of unilateral misalignment and delamination.

According to one embodiment of the present disclosure, a first guiding rail, a plurality of second guiding rails, and a reinforcing structure. The flexible display panel has a centerline parallel to a short side of the flexible display panel. The centerline of the flexible display panel passes through the first guiding rail. The second guiding rails are pivotally connected to each other, and two of the second guiding rails are pivotally connected to opposite two sides of the first guiding rail. The flexible display panel is accommodated in the first guiding rail and the second guiding rails, wherein the hardness of the first guiding rail is greater than the hardness of the second guiding rails. The reinforcing structure is disposed between the first guiding rail and the flexible display panel.

In one embodiment of the present disclosure, since the hardness of the first guiding rail, through which the centerline passes, is greater than the hardness of the second guiding rails and the reinforcing structure is disposed between the first guiding rail and the flexible display panel, the display device in the positions adjacent to the centerline are relatively steady when the display device is bent. As a result, the strain caused by bending can be dispersed on opposite two sides of the display device, thereby avoiding the occurrence of unilateral misalignment and delamination.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other words, in some embodiments of the present disclosure, these practical details are not necessary. Moreover, some well-known structures and devices are schematically depicted in order to simplify the drawings.

Figure 1:
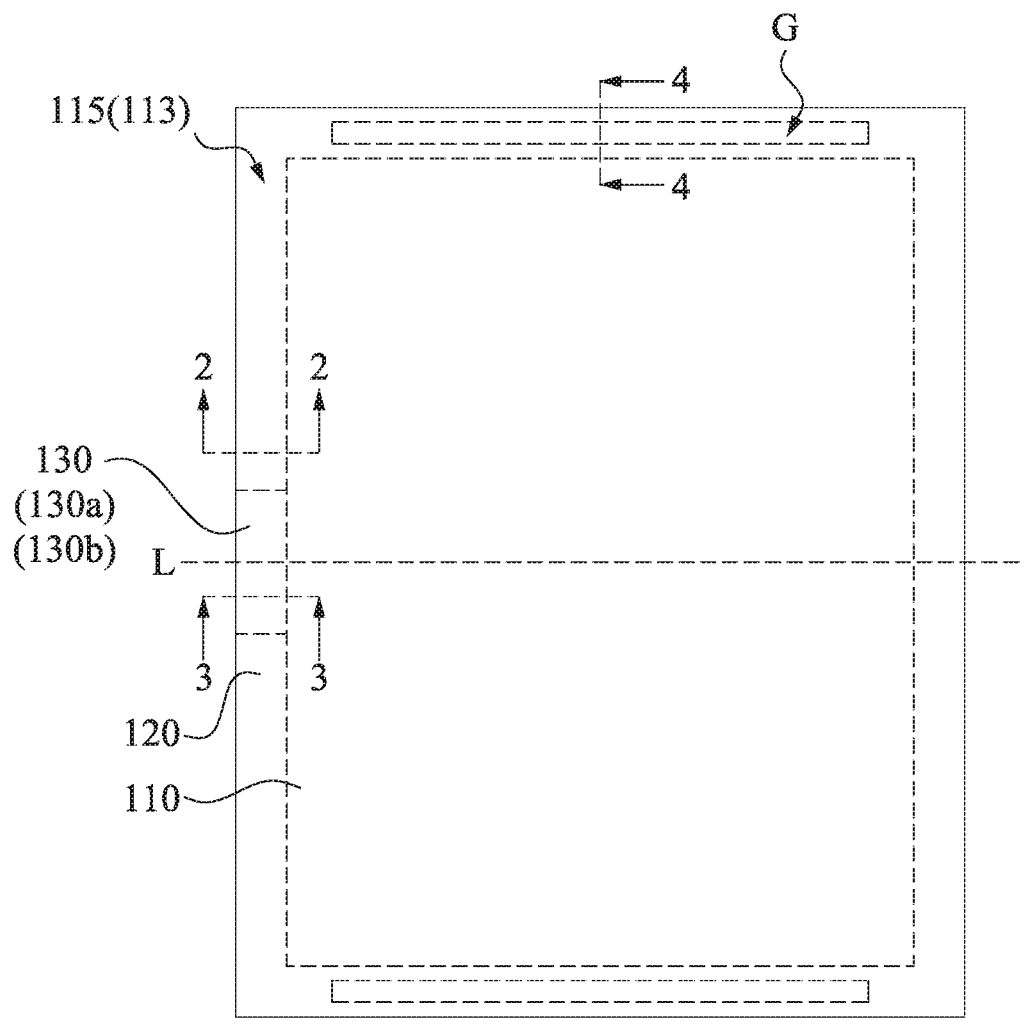
FIG. 1 is a top view of a display device according to one embodiment of the present disclosure.
Figure 2:
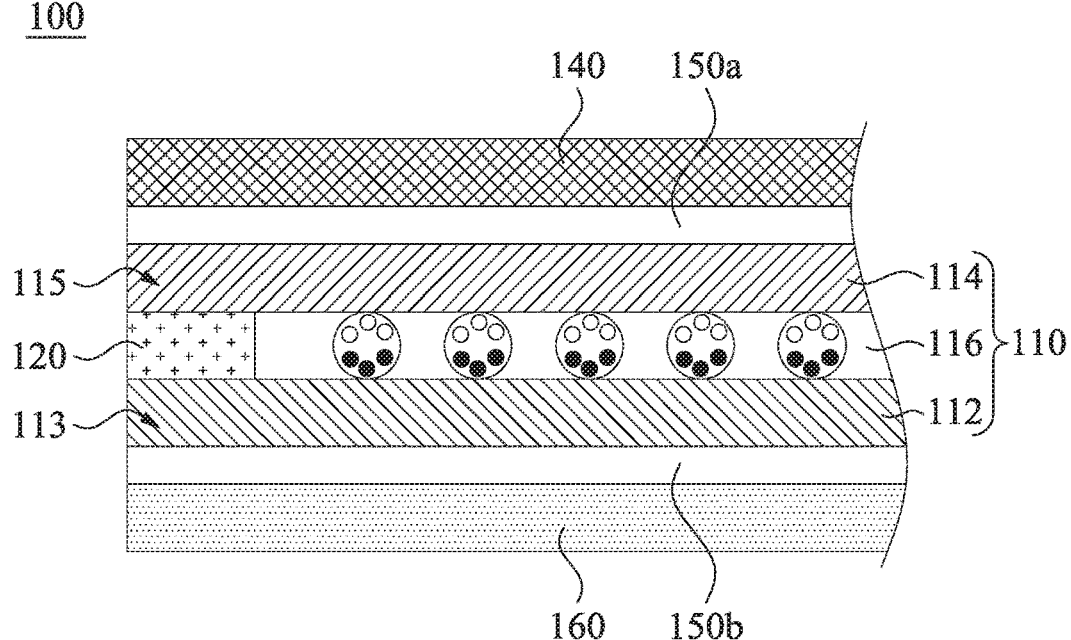
FIG. 2 is a cross-sectional view of the display device of FIG. 1 taken along line 2-2.
Figure 3:
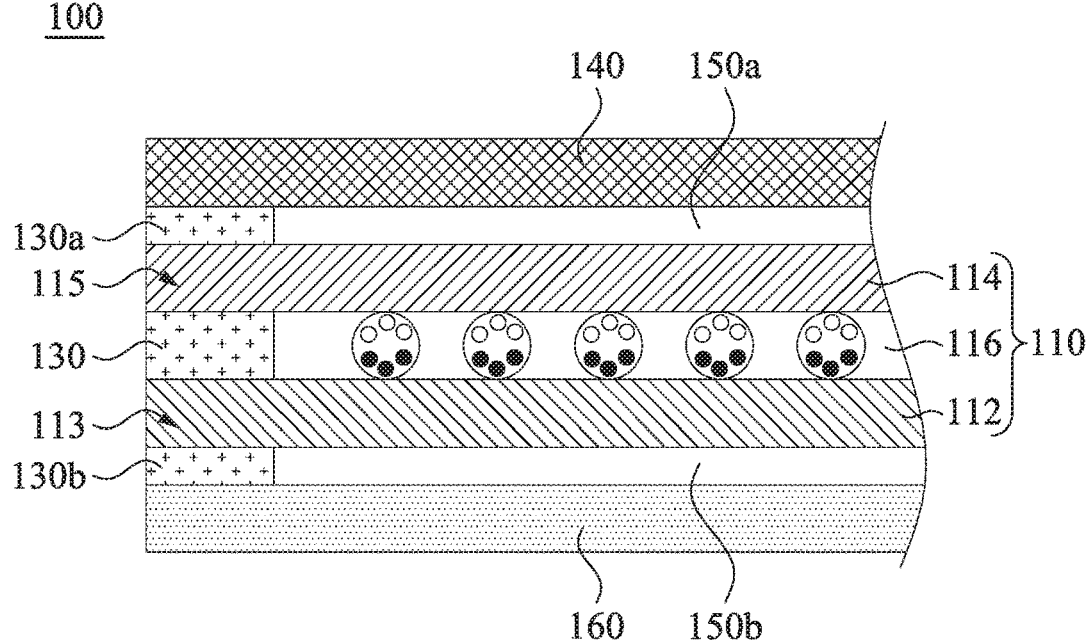
FIG. 3 is a cross-sectional view of the display device of FIG. 1 taken along line 3-3.

FIG. 1 is a top view of a display device 100 according to one embodiment of the present disclosure. FIG. 2 is a cross-sectional view of the display device 100 of FIG. 1 taken along line 2-2. FIG. 3 is a cross-sectional view of the display device 100 of FIG. 1 taken along line 3-3. Reference is made to FIG. 1 to FIG. 3, the display device 100 includes a flexible display panel 110, a sealant 120 (e.g., a package sealant), and a reinforcing structure 130. The flexible display panel 110 includes a lower substrate 112, an upper substrate 114, and a display medium layer 116 disposed between the lower substrate 112 and the upper substrate 114. The material of the lower substrate 112 may include polyimide (PI) and is provided with a thin-film transistor array (TFT array). The display medium layer 116 includes a colloid and microcapsules with charged particles. The display medium layer 116 can be used to reflect an incident light. The charged particles are, for example, black and white particles, but it is not limited thereto. In addition, the colloid may be a pressure sensitive adhesive (PSA).

The lower substrate 112 and the upper substrate 114 respectively have an edge region 113 and an edge region 115, and the edge regions 113, 115 can be regarded as a peripheral package region of the flexible display panel 110. The sealant 120 is disposed between the edge region 113 of the lower substrate 112 and the edge region 115 of the upper substrate 114. A centerline L of the flexible display panel 110 is parallel to a short side of the flexible display panel 110. In other words, the centerline L is perpendicular to a long side of the flexible display panel 110. In this embodiment, the reinforcing structure 130 is disposed in a region close to the centerline L. The elastic modulus of the reinforcing structure 130 is greater than that of the sealant 120, and the reinforcing structure 130 still has a sealing property and may be another type of sealant. The reinforcing structure 130 is disposed among the sealant 120, the edge region 113 of the lower substrate 112, and the edge region 115 of the upper substrate 114. The centerline L of the flexible display panel 110 passes through the reinforcing structure 130, and the elastic modulus (i.e., Young's modulus) of the reinforcing structure 130 is greater than the elastic modulus of the sealant 120.

In this embodiment, the reinforcing structure 130 may be a heat-curing adhesive or a photo-curing adhesive, and has high viscosity and high elasticity. The elastic modulus of the reinforcing structure 130 may be in a range from 3 GPa to 4 GPa, and the elastic modulus of the sealant 120 is lower than 1 GPa. The display device 100 (or the flexible display panel 110) can be bent or rolled up along the long sides. When the display device 100 is bent, the edge region 113 of the lower substrate 112 and the edge region 115 of the upper substrate 114 are relatively steady in the positions adjacent to the centerline L. As a result, the strain caused by bending can be dispersed on opposite two sides of the display device 100 (e.g., the upper and lower two short sides of FIG. 1), thereby avoiding the occurrences of unilateral misalignment and delamination. In the present disclosure, it is to be noted that the "bending" includes rolling up.

Moreover, in this embodiment, the display device 100 further includes an upper protective layer 140, an adhesive layer 150a, and a reinforcing structure 130a. The adhesive layer 150a is disposed between the upper protective layer 140 and the upper substrate 114. The reinforcing structure 130a is disposed among the upper protective layer 140, the adhesive layer 150a, and the edge region 115 of the upper substrate 114, and the centerline L of the flexible display panel 110 passes through the reinforcing structure 130a. Similarly, the display device 100 may further include a lower protective layer 160, an adhesive layer 150b, and a reinforcing structure 130b. The adhesive layer 150b is disposed between the lower protective layer 160 and the lower substrate 112. The reinforcing structure 130b is disposed between the lower protective layer 160, the adhesive layer 150b and the edge region 113 of the lower substrate 112, and the centerline L of the flexible display panel 110 passes through the reinforcing structure 130b. The material of the reinforcing structures 130a and 130b may be the same as the material of the reinforcing structure 130. The adhesive layers 150a, 150b may be an optical clear adhesive (OCA) or a pressure sensitive adhesive (PSA), but the present disclosure in not limited thereto. When the display device 100 is bent, the upper protective layer 140 and the lower protective layer 160 are relatively steady in the positions adjacent to the centerline L, and the strain due to the bend can be dispersed on opposite two sides of the display device 100 (e.g., the upper and lower two short sides of FIG. 1), thereby avoiding the occurrences of unilateral misalignment and delamination.

It is to be noted that the connection relationships of the aforementioned components, materials, and advantages will not be described in the following description.

The aforementioned design is to enhance the interlaminar stabilization in the central portion of the long sides of the display device 100. In the following description, it describes the design of enhancing the interlaminar stabilization for the short sides of the display device 100.

Figure 4:
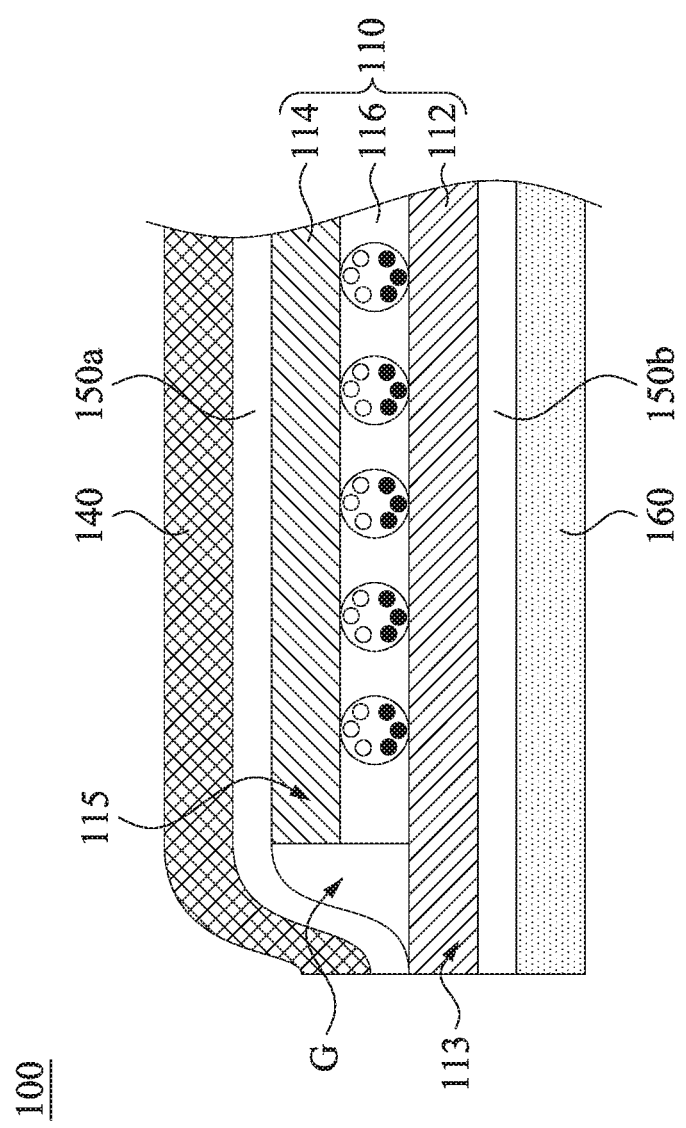
FIG. 4 is a cross-sectional view of the display device of FIG. 1 taken along line 4-4.

FIG. 4 is a cross-sectional view of the display device 100 of FIG. 1 taken along line 4-4. Reference is made to FIG. 1 in conjunction with FIG. 4, the display device 100 has an air gap G. The air gap G is located among the edge region 113 of the lower substrate 112, the display medium layer 116, the edge region 115 of the upper substrate 114, and the adhesive layer 150a, and the extending direction of the air gap G extends is parallel to the centerline L. The lower substrate 112 in the short side of the display device 100 protrudes from the display medium layer 116 and the upper substrate 114 for the upper protective layer 140 to be adhered thereto through the adhesive layer 150a. In other words, a portion of the edge region 113 of the lower substrate 112 is not covered by the display medium layer 116 and the upper substrate 114. As a result, when the display device 100 is bent, the air gap G can allow the upper protective layer 140 to be slightly displaced from the flexible display panel 110, thereby avoiding the interlaminar displacement to concentrate on the region of the display device 100 adjacent to the centerline L that causes the delamination.

Figure 5:
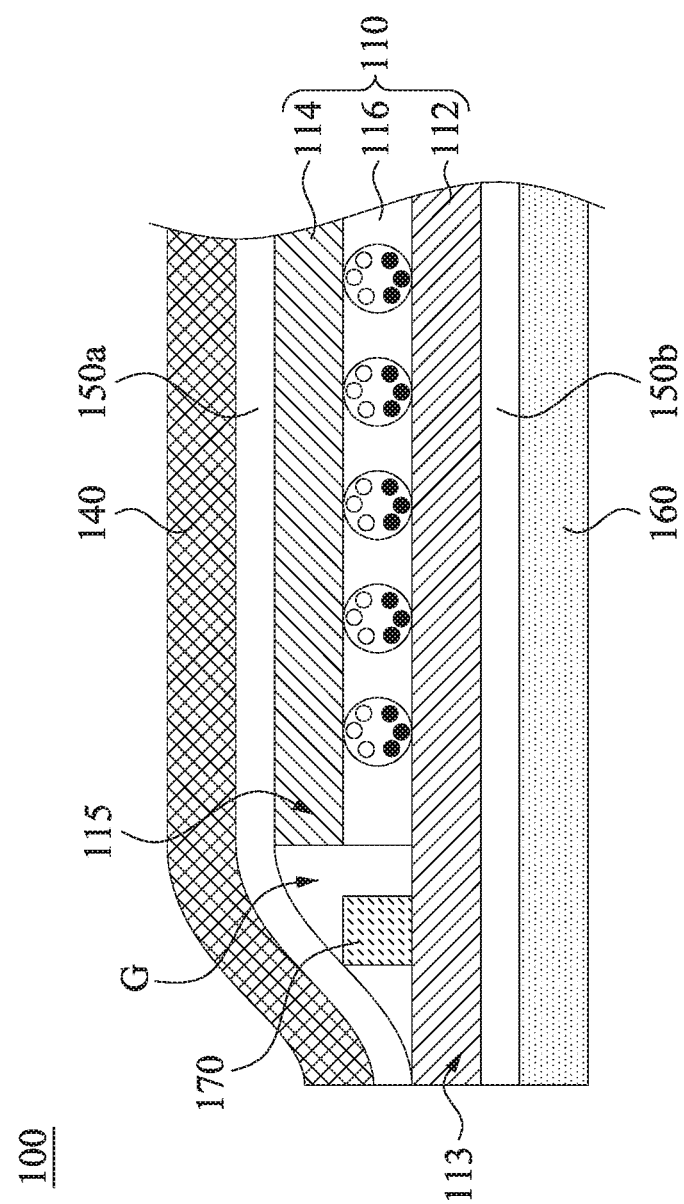
FIG. 5 is a cross-sectional view of the display device according to one embodiment of the present disclosure, in which the cross-sectional position is the same as that of FIG. 4.

FIG. 5 is a cross-sectional view of the display device 100 according to one embodiment of the present disclosure, in which the cross-sectional position is the same as that of FIG. 4. The difference from the embodiment of FIG. 4 is that the display device 100 of FIG. 5 further includes a support member 170. The support member 170 is disposed in the air gap G and on the edge region 113 of the lower substrate 112. The support member 170 is disposed along the length direction of the air gap G. When manufacturing the display device 100 of FIG. 5, the support member 170 can be first disposed on the short side of the lower substrate 112 to define a reserved space. In this way, when the upper protective layer 140 is pressed down and adhered to the lower substrate 112 through the adhesive layer 150a, the adhering position of the adhesive layer 150a is closer to the side surface of the lower substrate 112 since the supporting member 170 contacts thereagainst, thereby leaving a reserved space to form the air gap G. In this embodiment, the support member 170 may be an elongate tape of polyethylene terephthalate (PET) or polyimide (PI), but the present disclosure is not limited thereto.

Figure 6:
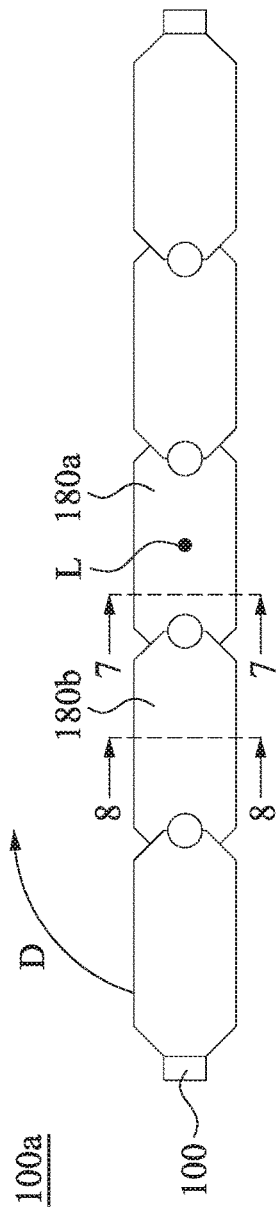
FIG. 6 is a side view of a display device according to one embodiment of the present disclosure.
Figure 7:
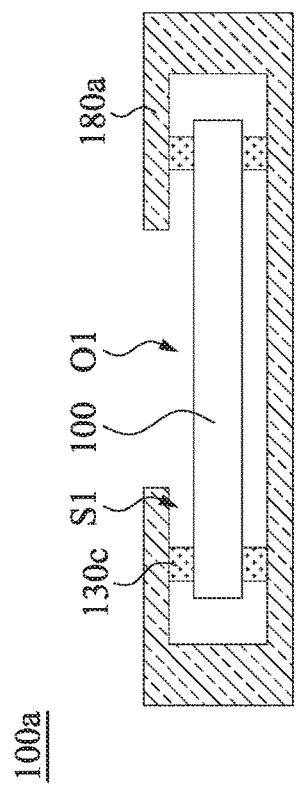
FIG. 7 is a cross-sectional view of the display device of FIG. 6 taken along line 7-7.
Figure 8:
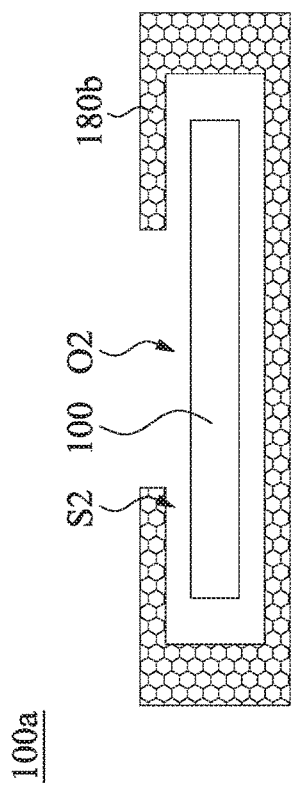
FIG. 8 is a cross-sectional view of the display device of FIG. 6 taken along line 8-8.

FIG. 6 is a side view of a display device 100a according to one embodiment of the present disclosure. FIG. 7 is a cross-sectional view of the display device 100a of FIG. 6 taken along line 7-7. FIG. 8 is a cross-sectional view of the display device 100a of FIG. 6 taken along line 8-8. Reference is made to FIG. 6 to FIG. 8, the display device 100a includes a first guiding rail 180a, a plurality of second guiding rails 180b, and a display device 100 of FIG. 1. The first guiding rail 180a and the second guiding rails 180b can be mounted on the case. The first guiding rail 180a and the second guiding rails 180b cover the bottom surface and the side surfaces of the display device 100, and at least partially extend to the top surface of the display device 100. The first guiding rail 180a and the second guiding rail 180b respectively have accommodation spaces S1 and S2 therein for accommodating the display device 100 which includes the flexible display panel 110 (referred to FIG. 3). The first guiding rail 180a and the second guiding rail 180b have an opening O1 and an opening O2, respectively. The opening O1 communicates with the accommodation space S1, and the opening O2 communicates with the accommodation space S2. When the display device 100 is rolled up in the direction D, it can move along the accommodation space S2 of the second guiding rail 180b. The opening O1 of the first guiding rail 180a and the opening O2 of the second guiding rail 180b expose the display area on the top surface of the display device 100 for the user to watch.

Furthermore, the display device 100a further includes reinforcing structures 130c. The reinforcing structures 130c are disposed between the first guiding rail 180a and the display device 100. In more detail, referred to FIG. 3, the reinforcing structures 130c are disposed between the first guiding rail 180a and the upper protective layer 140 and between the first guiding rail 180a and the lower protective layer 160. In other words, the reinforcing structures 130c are disposed between the first guiding rail 180a and the flexible display panel 110. In this embodiment, the first guiding rail 180a is disposed on the position where the centerline L (also referred to FIG. 1) passes through. The second guiding rails 180b are pivotally connected to each other, and two of the second guiding rails 180b are pivotally connected to the opposite two sides of the first guiding rails 180a without being passed through by the centerline L. The hardness of the first guiding rail 180a is greater than the hardness of the second guiding rail 180b. For example, the material of the first guiding rail 180a may be metal (e.g., stainless steel), and the material of the second guiding rail 180b may be rubber.

The reinforcing structure 130c can be adhered to the display device 100. When the display device 100a is rolled up in the direction D, the display device 100 in the accommodation space S1 fails to move, and the display device 100 only in the accommodation space S2 can move along the second guiding rail 180b. At half of the length where the display device 100a is fully unfolded (i.e., the position where the centerline L passes through), the reinforcing structures 130c can fix the upper protective layer 140 and the lower protective layer 160 on the first guiding rail 180a. This fixing manner limits the relative positions of the upper protective layer 140 and the lower protective layer 160 in the first guiding rail 180a to be totally unchanged no matter whether the display device 100a is unfolded or rolled up. As a result, when the interlaminar displacement occurs between the upper protective layer 140 and the lower protective layer 160 due to the bend, they are shifted only towards the two short sides of the display device 100 (i.e., the left and right two sides of FIG. 6). In this embodiment, the material of the reinforcing structures 130c may be epoxy, but it is not limited thereto.

Since the hardness of the first guiding rail 180a through which the centerline L passes is greater than the hardness of the second guiding rail 180b, and the reinforcing structures 130c are disposed between the first guiding rail 180a and the display device 100 which includes the flexible display panel 110 (referred to FIG. 3), the positions adjacent to the centerline L are relatively steady when the display device 100a is bent. As a result, the strain caused by bending can be dispersed on opposite two sides of the display device 100a, thereby avoiding the occurrence of unilateral misalignment and delamination.

Figure 9:
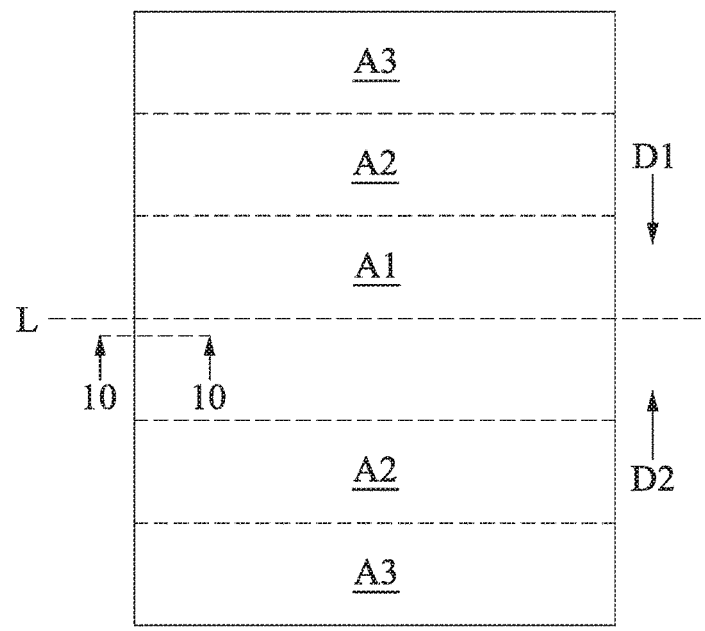
FIG. 9 is a top view of a display device according to one embodiment of the present disclosure.
Figure 10:
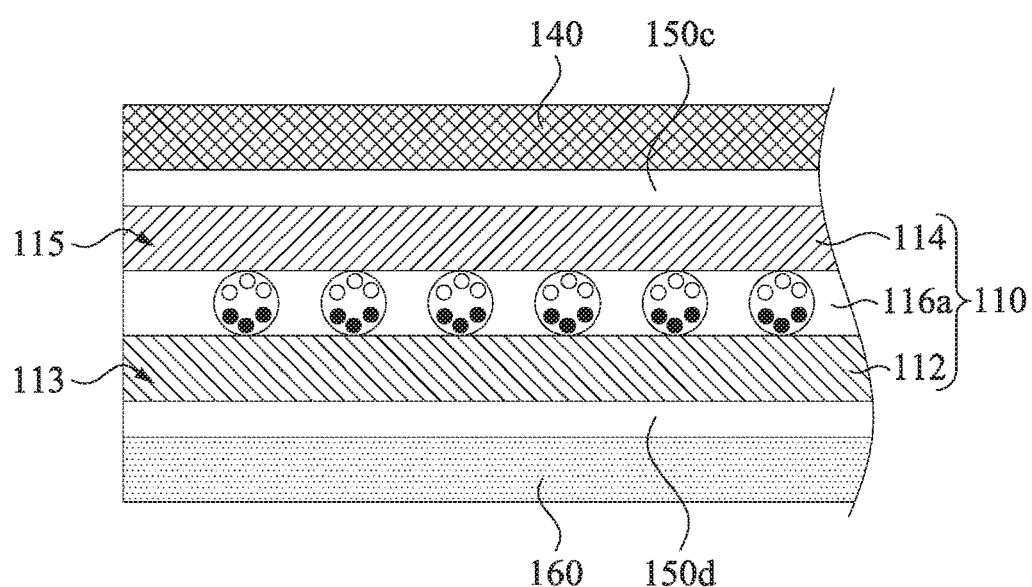
FIG. 10 is a cross-sectional view of the display device of FIG. 9 taken along line 10-10.

FIG. 9 is a top view of a display device 100b according to one embodiment of the present disclosure. FIG. 10 is a cross-sectional view of the display device 100b of FIG. 9 taken along line 10-10. Reference is made to FIG. 9 in conjunction with FIG. 10, the display device 100b includes a flexible display panel 110, an upper protective layer 140, an adhesive layer 150c, a lower protective layer 160, and an adhesive layer 150d. The flexible display panel 110 includes a lower substrate 112, an upper substrate 114, and a display medium layer 116a. The difference from the embodiments of FIG. 1 and FIG. 3 is that the viscosity or elasticity of at least one of the adhesive layer 150c and the adhesive layer 150d gradually increases along the directions D1 and D2 towards the centerline L of the flexible display panel 110, and the reinforcing structures 130, 130a, 130b are omitted.

In this embodiment, the centerline L passes through the area A1, so the viscosity or elasticity of the adhesive layer 150c (or the adhesive layer 150d) in the area A1 is greater than that of the adhesive layer 150c (or the adhesive layer 150d) in the area A2, and the viscosity or elasticity of the adhesive layer 150c (or the adhesive layer 150d) in the area A2 is greater than that of the adhesive layer 150c (or the adhesive layer 150d) in the area A3. The present disclosure is not limited to the number of the aforementioned areas. During the fabrication, at least one of the adhesive layer 150c and the adhesive layer 150d can be processed by using a gradient difference based curing method. For example, if the adhesive layer 150c and the adhesive layer 150d are heat-curing or ultraviolet (UV)-curing adhesive and the adhesive layers 150c, 150d in the area A1 through which the centerline L passes are cured with higher energy (high power or long time), then the adhesive layers 150c, 150d in the area adjacent to the centerline L (e.g., the areas A1) may have higher viscosity or elasticity than the two sides (e.g., the areas A3), so that the misalignment preferentially occurs on the two sides (e.g., the upper and lower short two sides of FIG. 9) when the display device 100b is bent.

Since the viscosity or elasticity of the adhesive layers 150c, 150d can gradually increase towards the centerline L of the flexible display panel 110, the upper protective layer 140 and the lower protective layer 160 in the positions adjacent to the centerline L are relatively steady when the display device 100b is bent. In this way, the strain caused by bending can be dispersed on opposite two sides of the display device 100b (e.g., the upper and lower two short sides of FIG. 9), thereby avoiding the occurrence of unilateral misalignment and delamination.

Figure 11:
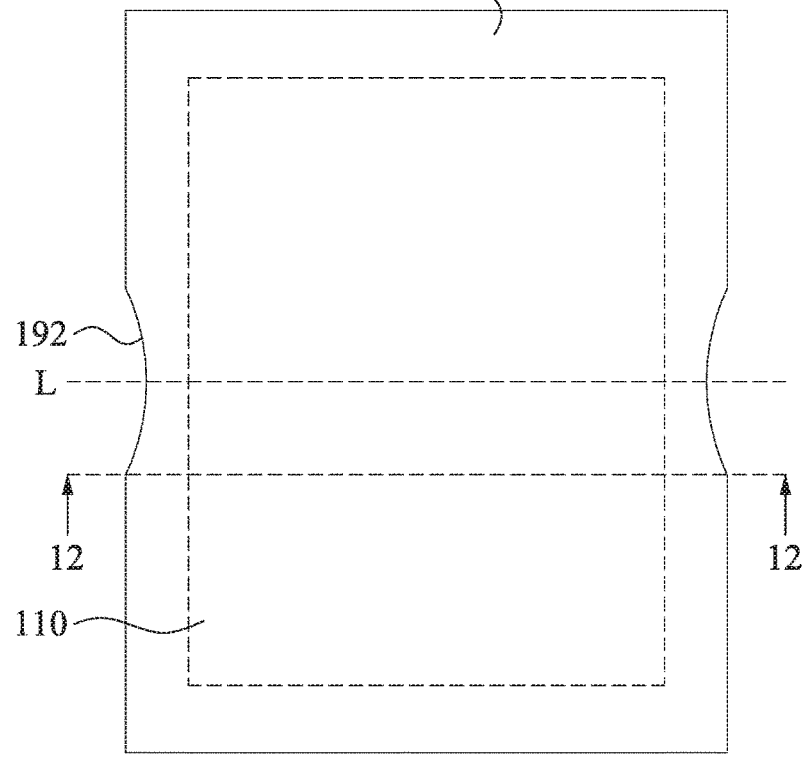
FIG. 11 is a top view of a display device according to one embodiment of the present disclosure.
Figure 12:
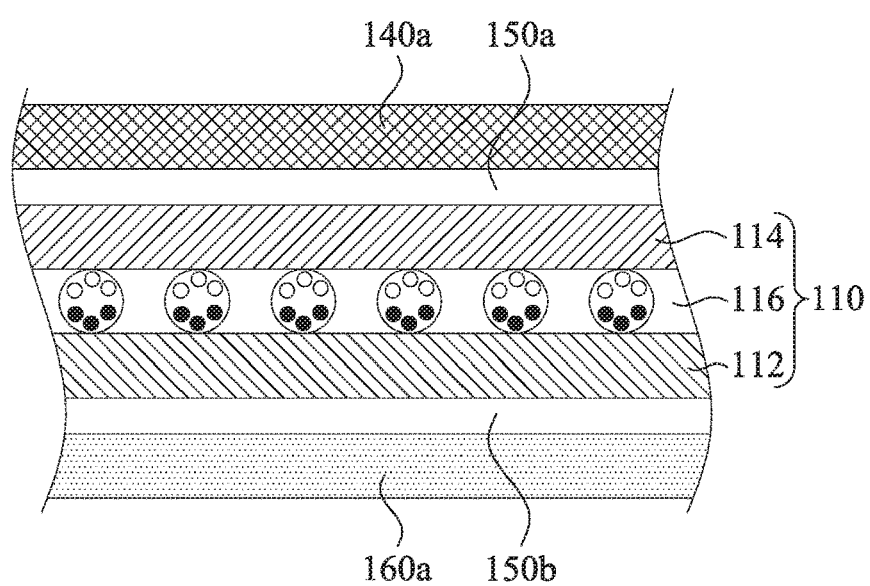
FIG. 12 is a cross-sectional view of the display device of FIG. 11 taken along line 12-12.

FIG. 11 is a top view of a display device 100c according to one embodiment of the present disclosure. FIG. 12 is a cross-sectional view of the display device 100c of FIG. 11 taken along line 12-12. Reference is made to FIG. 11 in conjunction with FIG. 12, the display device 100c includes a flexible display panel 110, an upper protective layer 140a, an adhesive layer 150a, a lower protective layer 160a, and an adhesive layer 150b. The flexible display panel 110 includes a lower substrate 112, an upper substrate 114, and a display medium layer 116. In this embodiment, the upper protective layer 140a, the adhesive layer 150a, the adhesive layer 150b and the lower protective layer 160a all have a concave portion 192. The concave portion 192 of the upper protective layer 140a and the concave portion 192 of the lower protective layer 160a respectively contact the adhesive layer 150a, 150b, and the centerline L passes through the concave portion 192.

When each of the upper protective layer 140a and the lower protective layer 160a is adhered to the flexible display panel 110, the upper protective layer 140a and the lower protective layer 160a have more adhering area in the areas adjacent to the centerline L so as to increase the steadiness. Furthermore, the interlaminar strain caused by bending or rolling up the display device 100c may encounter the geometric resistances of the concave portions 192 of the upper protective layer 140a and the lower protective layer 160a in the areas adjacent to the centerline L. In this way, the interlaminar strain can only move towards the two sides (e.g., the upper and lower two short sides of FIG. 11), thereby avoiding the delamination caused by the unilateral concentration of the interlaminar strain.

Figure 13:
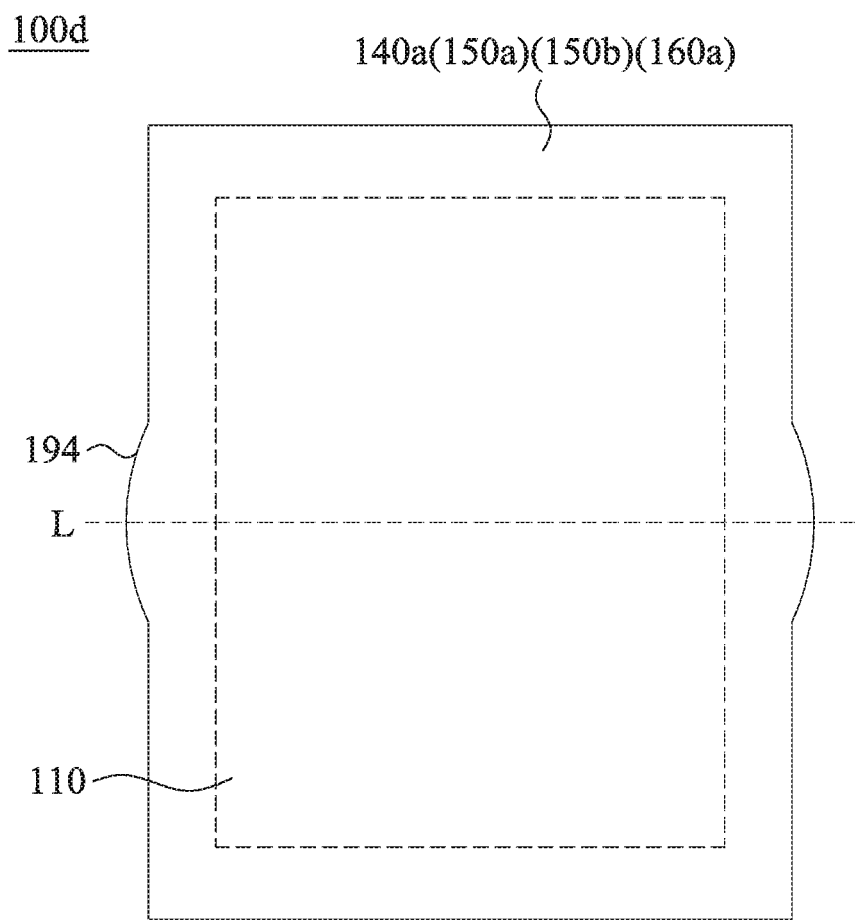
FIG. 13 is a top view of a display device according to one embodiment of the present disclosure.

FIG. 13 is a top view of a display device 100d according to one embodiment of the present disclosure. The display device 100d includes an upper protective layer 140a, an adhesive layer 150a, a lower protective layer 160a, an adhesive layer 150b, and a flexible display panel 110 of FIG. 11. The difference from the embodiment of FIG. 11 is that the upper protective layer 140a, the adhesive layer 150a, the lower protective layer 160a, and the adhesive layer 150b of the display device 100d all have a convex portion 194, and the centerline L passes through the convex portion 194. The convex portion 194 of the upper protective layer 140a and the convex portion 194 of the lower protective layer 160a respectively contact the adhesive layers 150a, 150b, and the centerline L passes through the convex portion 194. Such a design may also have the aforementioned effect of the concave portion 192 of FIG. 11.

Figure 14A:
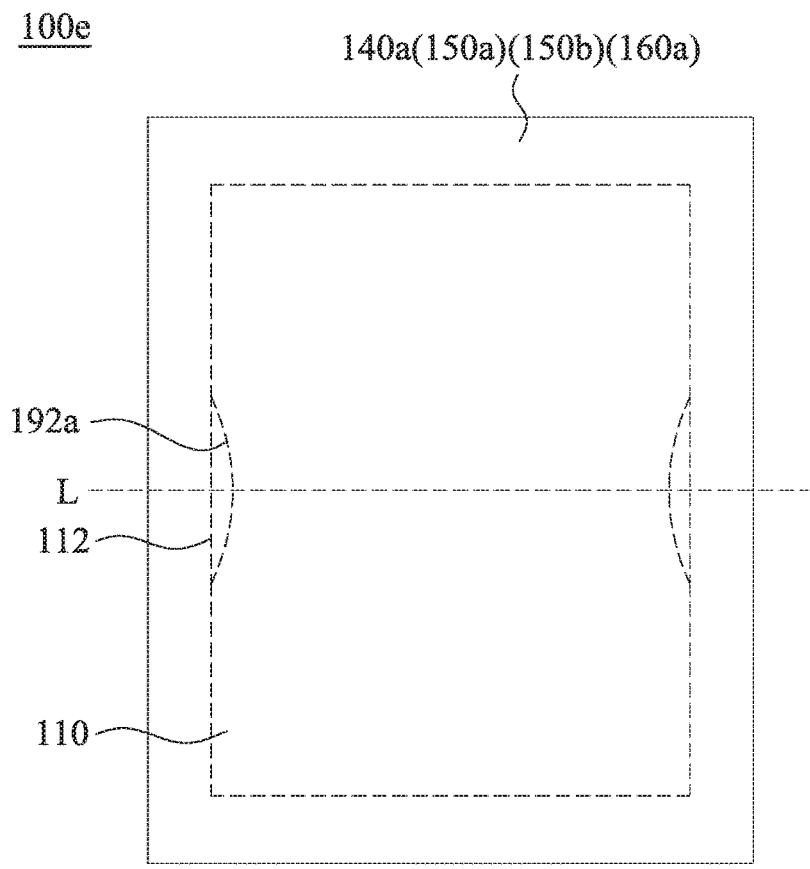
FIG. 14A is a top view of a display device according to one embodiment of the present disclosure.
Figure 14B:
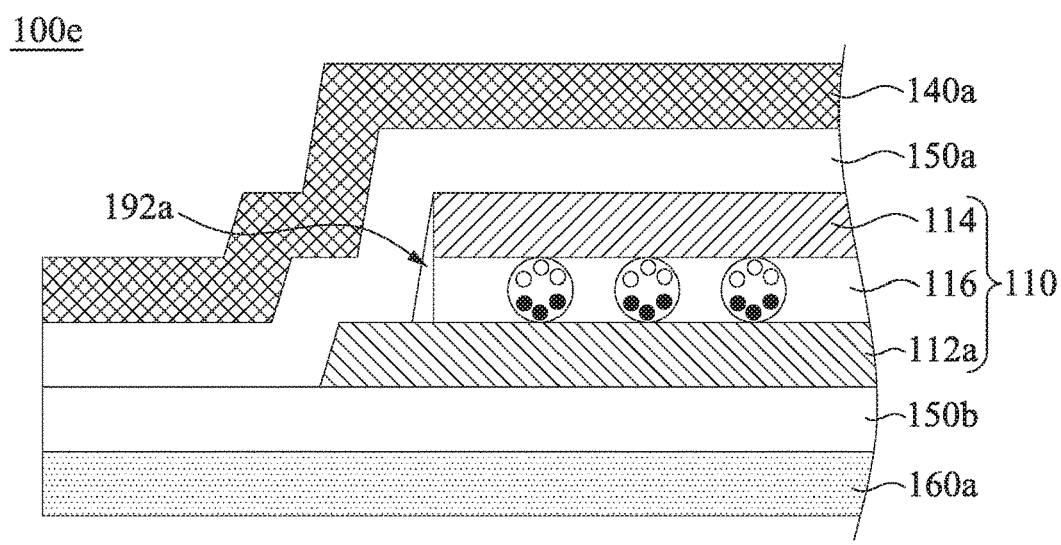
FIG. 14B is a cross-sectional view of the display device of FIG. 14A taken along a centerline L.

FIG. 14A is a top view of a display device 100e according to one embodiment of the present disclosure. FIG. 14B is a cross-sectional view of the display device 100e of FIG. 14A taken along the centerline L. Reference is made to FIG. 14A in conjunction with FIG. 14B, the display device 100e includes an upper protective layer 140a, an adhesive layer 150a, a lower protective layer 160a, an adhesive layer 150b, and a flexible display panel 110. In this embodiment, the upper substrate 114 and the display medium layer 116 are shrank from the lower substrate 112a. In other words, the lower substrate 112a protrudes from the upper substrate 114 and the display medium layer 116. In this way, the edges of the upper substrate 114 and the display medium layer 116 can form a concave portion 192a together, and the centerline L passes through the concave portion 192a. In this embodiment, the adhesive layer 150a is in contact with the adhesive layer 150b, the lower substrate 112a, and the upper substrate 114 in the order from the outside to the inside, so that an additional adhering area can be added and the geometrical resistance is formed in the areas near the centerline L when the display device 100e is rolled up. As a result, the interlaminar strain can move only towards the two sides (e.g., the upper and lower two short sides of FIG. 14A), thereby avoiding the delamination caused by the unilateral concentration of the interlaminar strain.

Figure 15A:
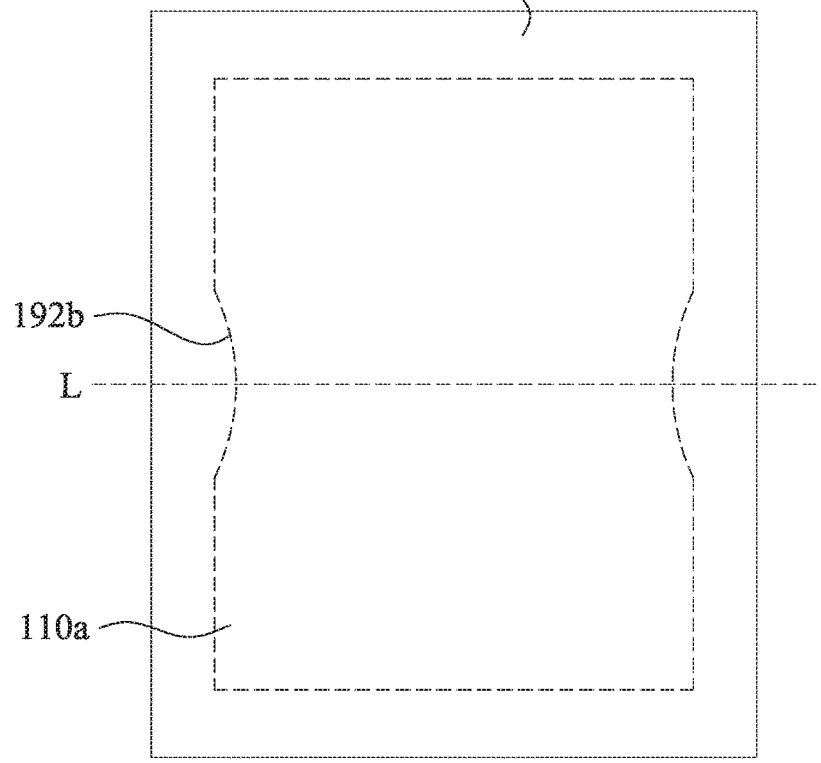
FIG. 15A is a top view of a display device according to one embodiment of the present disclosure.
Figure 15B:
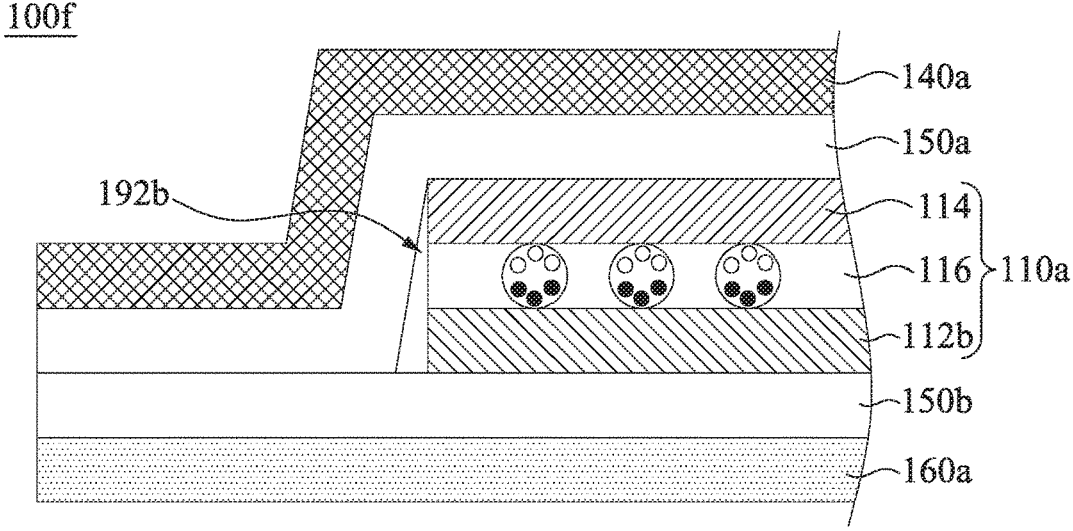
FIG. 15B is a cross-sectional view of the display device of FIG. 15A taken along a centerline L.

FIG. 15A is a top view of a display device 100f according to one embodiment of the present disclosure. FIG. 15B is a cross-sectional view of the display device 100f of FIG. 15A taken along the centerline L. Reference is made to FIG. 15A in conjunction with FIG. 15B, the display device 100f includes an upper protective layer 140a, an adhesive layer 150a, a lower protective layer 160a, an adhesive layer 150b, and a flexible display panel 110a. The difference from the embodiments of FIG. 14A and FIG. 14B is that the edges of the upper substrate 114, the display medium layer 116, and the lower substrate 112b of the flexible display panel 110a are substantially aligned. In this way, the edges of the upper substrate 114, the display medium layer 116, and the lower substrate 112b can form the concave portion 192b together, and the centerline L passes through the concave portion 192b. In this embodiment, the adhesive layer 150a is in contact with the adhesive layer 150b and the upper substrate 114 in the order from the outside to the inside, so that an additional adhering area can be added and the geometrical resistance is formed in the areas near the centerline L when the display device 100f is rolled up. In this way, the interlaminar strain can only move towards the two sides (e.g., the upper and lower two short sides of FIG. 15A), thereby avoiding the delamination caused by the unilateral concentration of the interlaminar strain.

The display device of the present disclosure can use the components and structures in the aforementioned embodiments independently or combinationally as deemed necessary by designers.

While various embodiments of the present disclosure have been described above, it should be understood that they have been presented by way of example only, and not limitation. Numerous changes to the disclosed embodiments can be made in accordance with the disclosure herein without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A display device, comprising:
   a flexible display panel comprising a lower substrate, an upper substrate and a display medium layer disposed between the lower substrate and the upper substrate, wherein each of the lower substrate and the upper substrate has an edge region, and a centerline of the flexible display panel is parallel to a short side of the flexible display panel;
   a sealant disposed between the edge region of the lower substrate and the edge region of the upper substrate; and
   a first reinforcing structure disposed among the sealant, the edge region of the lower substrate, and the edge region of the upper substrate, wherein the centerline passes through the first reinforcing structure, and an elastic modulus of the first reinforcing structure is greater than an elastic modulus of the sealant.

2. The display device of claim 1, wherein the first reinforcing structure is a heat-curing adhesive or a photo-curing adhesive.

3. The display device of claim 1, wherein the elastic modulus of the first reinforcing structure is in a range from 3 GPa to 4 GPa.

4. The display device of claim 1, further comprising:
   an upper protective layer; and
   an adhesive layer disposed between the upper protective layer and the upper substrate.

5. The display device of claim 4, further comprising:
   a second reinforcing structure disposed among the upper protective layer, the adhesive layer, and the edge region of the upper substrate, wherein the centerline of the flexible display panel passes through the second reinforcing structure.

6. The display device of claim 1, further comprising:
   a lower protective layer; and
   an adhesive layer disposed between the lower protective layer and the lower substrate.

7. The display device of claim 6, further comprising:
   a second reinforcing structure disposed among the lower protective layer, the adhesive layer, and the edge region of the lower substrate, wherein the centerline of the flexible display panel passes through the second reinforcing structure.

8. The display device of claim 4, wherein the display device has an air gap, the air gap is located among the edge region of the lower substrate, the display medium layer, the edge region of the upper substrate, and the adhesive layer, and an extending direction of the air gap is parallel to the centerline.

9. The display device of claim 8, further comprising:
   a support member disposed in the air gap and on the edge region of the lower substrate.

10. The display device of claim 1, further comprising:
    a first guiding rail, wherein the centerline of the flexible display panel passes through the first guiding rail; and
    a plurality of second guiding rails pivotally connected to each other, wherein two of the second guiding rails are pivotally connected to opposite two sides of the first guiding rail, and the flexible display panel is accommodated in the first guiding rail and the second guiding rails, and a hardness of the first guiding rail is greater than a hardness of the second guiding rails.

11. The display device of claim 10, wherein a material of the first guiding rail is metal, and a material of the second guiding rails is rubber.

12. The display device of claim 10, further comprising:
    a second reinforcing structure disposed between the first guiding rail and the flexible display panel.

13. A display device, comprising:
    a flexible display panel comprising a lower substrate, an upper substrate, and a display medium layer disposed between the lower substrate and the upper substrate, wherein a centerline of the flexible display panel is parallel to a short side of the flexible display panel;
    an upper protective layer;
    a first adhesive layer disposed between the upper protective layer and the upper substrate, wherein the display device has an air gap located among an edge region of the lower substrate, the display medium layer, an edge region of the upper substrate and the first adhesive layer, and an extending direction of the air gap is parallel to the centerline;
    a support member disposed in the air gap and on the edge region of the lower substrate;
    a lower protective layer; and
    a second adhesive layer disposed between the lower protective layer and the lower substrate, wherein at least one of the first adhesive layer and the second adhesive layer has greater viscosity or elasticity in the position close to the centerline than in the position far away from the centerline.

14. The display device of claim 13, wherein the upper protective layer has a concave portion or a convex portion which contacts the first adhesive layer, and the centerline of the flexible display panel passes through the concave portion or the convex portion.

15. The display device of claim 13, wherein the upper substrate has a concave portion or a convex portion which contacts the first adhesive layer, and the centerline of the flexible display panel passes through the concave portion or the convex portion.

16. The display device of claim 13, wherein the lower protective layer has a concave portion or a convex portion which contacts the second adhesive layer, and the centerline of the flexible display panel passes through the concave portion or the convex portion.

17. The display device of claim 13, further comprising:
a first guiding rail, wherein the centerline of the flexible display panel passes through the first guiding rail; and
a plurality of second guiding rails pivotally connected to each other, wherein two of the second guiding rails are pivotally connected to opposite two sides of the first guiding rail, and the flexible display panel is accommodated in the first guiding rail and the second guiding rails, and a hardness of the first guiding rail is greater than a hardness of the second guiding rails.

18. The display device of claim 17, wherein a material of the first guiding rail is metal, and a material of the second guiding rails is rubber.

19. The display device of claim 17, further comprising:
a reinforcing structure disposed between the first guiding rail and the flexible display panel.

20. A display device, comprising:
a flexible display panel comprising a lower substrate, an upper substrate, and a display medium layer disposed between the lower substrate and the upper substrate, wherein a centerline of the flexible display panel is parallel to a short side of the flexible display panel;
an upper protective layer;
a first adhesive layer disposed between the upper protective layer and the upper substrate, wherein the display device has an air gap located among an edge region of the lower substrate, the display medium layer, an edge region of the upper substrate and the first adhesive layer, and an extending direction of the air gap is parallel to the centerline;
a support member disposed in the air gap and on the edge region of the lower substrate;
a lower protective layer; and
a second adhesive layer disposed between the lower protective layer and the lower substrate, wherein at least one of the upper protective layer, the upper substrate and the lower protective layer has a concave portion or a convex portion, the concave portion or the convex portion contacts one of the first adhesive layer and the second adhesive layer, and the centerline passes through the concave portion or the convex portion.

21. The display device of claim 20, further comprising:
a first guiding rail, wherein the centerline of the flexible display panel passes through the guiding first rail; and
a plurality of second guiding rails pivotally connected to each other, wherein two of the second guiding rails are pivotally connected to opposite two sides of the first guiding rail, and the flexible display panel is accommodated in the first guiding rail and the second guiding rails, and a hardness of the first guiding rail is greater than a hardness of the second guiding rails.

22. The display device of claim 21, wherein a material of the first guiding rail is metal, and a material of the second guiding rails is rubber.

23. The display device of claim 21, further comprising:
a reinforcing structure disposed between the first guiding rail and the flexible display panel.

* * * * *